United States Patent [19]

Hurlock et al.

[11] Patent Number: 5,597,859
[45] Date of Patent: Jan. 28, 1997

[54] SEED PROCESS FOR SALT DISPERSION POLYMER

[75] Inventors: John R. Hurlock, Hickory Hills; Manian Ramesh, Naperville, both of Ill.

[73] Assignee: Nalco Chemical Company, Naperville, Ill.

[21] Appl. No.: 446,119

[22] Filed: May 19, 1995

Related U.S. Application Data

[62] Division of Ser. No. 163,778, Dec. 9, 1993.

[51] Int. Cl.$^6$ .................... C08F 2/16; C08F 2/28; C08F 220/60; C08F 220/54
[52] U.S. Cl. ................ 524/458; 524/555; 524/521; 525/217; 525/218; 526/307; 526/307.2; 526/307.7; 526/310; 526/307.3
[58] Field of Search .................... 524/458, 555, 524/521; 525/217, 218; 526/307, 307.2, 307.3, 307.7, 310

[56] References Cited

U.S. PATENT DOCUMENTS

| 4,164,612 | 8/1979 | Suzuki et al. | 526/62 |
| 4,835,206 | 5/1989 | Farrar et al. | 524/458 |
| 4,929,655 | 5/1990 | Takeda et al. | 524/458 |
| 5,006,590 | 4/1991 | Takeda et al. | 524/458 |

FOREIGN PATENT DOCUMENTS 7090035  4/1995  Japan .

*Primary Examiner*—Paul R. Michl
*Assistant Examiner*—Andrew E. C. Merriam
*Attorney, Agent, or Firm*—Robert A. Miller; James J. Drake; Patricia A. Charlier

[57] ABSTRACT

A novel dispersant system is disclosed for use in forming dialkylaminoalkyl (meth)acylamide polymer dispersions.

14 Claims, No Drawings

SEED PROCESS FOR SALT DISPERSION POLYMER

This application is a division of application Ser. No. 08/163,778, filed Dec. 9, 1993, pending.

FIELD OF THE INVENTION

The present invention relates to the novel process for the production of a dispersion of a water soluble polymer.

BACKGROUND OF THE INVENTION

Conventional processes for the preparation of a water soluble cationic polymer useful as a flocculent include polymerization in an aqueous solution, water-in-oil emulsion polymerization, and suspension polymerization in a hydrophobic solvent. Others have prepared a water soluble, anionic polymer by precipitation polymerization in an aqueous solution of ammonium sulfate. Still others have carried out the polymerization in an aqueous solution in the presence of a polyhydric alcohol or a polyelectrolyte as a dispersant.

U.S. Pat. No. 4,929,655 (Takeda et at.), which issued on May 29, 1990, and which is incorporated herein by reference, provided a novel process for preparing a water soluble polymer dispersion which overcomes the many disadvantages of the stationary polymerization, water-in-oil type emulsion polymerization and suspension polymerization processes. This process for the production of a water soluble dispersion includes the polymerization of water soluble monomers of 5 to 100 mole % of a cationic monomer represented by the following formula (I), 0 to 50 mole % of another cationic monomer represented by the following formula (II) and 0 to 95 mole % (meth)acrylamide in the presence of 1 to 10% by weight of an organic high molecular multivalent cation comprising a water soluble polymer containing at least a monomer of formula (II) (i.e., a hydrophilic monomer), based on the total weight of the monomers, in an aqueous multivalent anionic salt solution having a concentration of 15% by weight or more. The first cationic monomer discussed above can be represented by the following general formula (I):

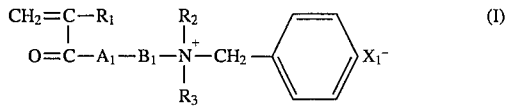

where $R_1$ is either hydrogen or $CH_3$; $R_2$ and $R_3$ ar each an alkyl group having 1 to 3 carbon atoms; $A_1$ is either an oxygen atom or NH; $B_1$ is either an alkylene group having 2 to 4 carbon atoms or a hydroxypropylene group, and $X_1^-$ is an anionic counterion, and/or a second cationic monomer represented by the following general formula (II):

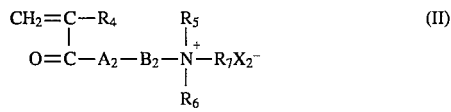

where $R_4$ is either hydrogen or $CH_3$; $R_5$ and $R_6$ are each an alkyl group having 1 to 2 carbon atoms; $R_7$ is a hydrogen atom or an alkyl group having 1 to 2 carbon atoms; $A_2$ is either an oxygen atom or NH; $B_2$ is either an alkylene group having 2 to 4 carbon atoms or a hydroxypropylene group and $X_2^-$ is an anionic counterion.

U.S. Pat. No. 5,006,590 (Takeda et at.), which issued on Apr. 9, 1991, and which is incorporated herein by reference, is similar to Takeda '655, except that polymerization is carried out in the presence of both: (1) a water soluble cationic polymer which is insoluble in an aqueous solution of a polyvalent anionic salt (seed polymer); and (2) a water soluble cationic polymer which is soluble in an aqueous solution of a polyvalent anionic salt (dispersant polymer). The water soluble cationic polymer that is insoluble in the aqueous solution of polyvalent anionic salt contains at least 5 mole % of cationic monomer units represented by the aforementioned general formula (I) above and the water soluble cationic polymer that is soluble in the aqueous solution of a polyvalent anionic salt contains at least 20 mole % of cationic monomer units represent by the general formula (II) above.

Although the final polymer dispersion viscosities were satisfactory, i.e., 1,000 cp or below, the processes disclosed in U.S. Pat. Nos. 4,929,655 and 5,006,590 proceed through very high process viscosities (i.e., >100,000 cp and usually as high as 2,000,000 cp), which require the use of a custom built high viscosity polymerization reactor. Due to these high process viscosities, the methods disclosed in U.S. Pat. Nos. 4,929,655 and 5,006,590 can only be used in the synthesis of polymer systems containing low polymer contents (i.e., 15 to 20%).

The present inventors have discovered through extensive experimentation, that hydrophobically modified diallyldimethylammonium chloride (DADMAC) polymers can be used in combination with the dispersant polymers disclosed in U.S. Pat. Nos. 4,929,655 and 5,006,590 as colloidal stabilizers in the dispersion polymerization process. The dispersant system of the invention is highly soluble in water and at least partially soluble in aqueous salt solutions. The dispersant system has been demonstrated to facilitate the precipitation process and thereby very significantly reducing the process viscosity. This allows the production of high molecular weight polymer dispersions in a conventional latex-type reactor, thereby avoiding the substantial costs associated with high viscosity custom built polymerization reactors. Further, the reduction in process viscosity will allow the preparation of polymer systems containing higher actives (such as, from 15 to about 30–40 percent by weight) in latex-type reactors.

Moreover, it has also been discovered that even lower production viscosities are maintained through subsequent polymerizations when from about 1.5 to about 12 percent by weight of polymer from one polymerization process is used as the seed in the next polymerization generation of the same polymer. It should be noted that it has been determined that when the dispersant polymers of the invention used independently of each other, production viscosity increases with each successive generation, until, process viscosity becomes so great that standard latex-type reaction will not accommodate the process. The present inventors have also determined that the multivalent anionic salt concentration can be optimized to control process viscosity.

The present invention provides many additional advantages which shall become apparent as described below.

SUMMARY OF THE INVENTION

A dispersant system used in forming polymer dispersions which comprises: a copolymer of diallyldimethylammonium chloride and a hydrophobic monomer selected from the group consisting of dialkylaminoalkylacrylates having $C_6$ to $C_{20}$ quaternaries, dialkylaminoalkylmethacrylates having $C_6$ to $C_{20}$ quaternaries, dialkylaminoalkyl (meth)acrylamides having $C_6$ to $C_{20}$ quaternaries, and alkyl esters of acrylic acid; and a water soluble high molecular weight cationic copolymer composed of 20 mole % or more of cationic monomer units represented by the formula (II), preferably the residual mole % is acrylamide or methacrylamide.

The novel dispersant system according to the present invention is particularly useful in preparing a water soluble polymer dispersion. According to one preferred embodiment of the invention, the dispersion is prepared by polymerizing a water soluble mixture of from about 15 to about 40% percent by weight of a cationic monomer represented by the following general formula (I):

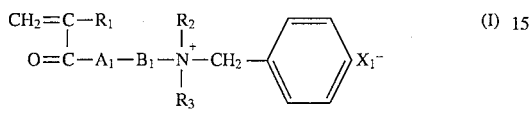

where $R_1$ is either hydrogen or $CH_3$; $R_2$ and $R_3$ are each an alkyl group having 1 to 3 carbon atoms; $A_1$ is either an oxygen atom or NH; $B_1$ is either an alkylene group having 2 to 4 carbon atoms or a hydroxypropylene group, and $X_1^-$ is an anionic counterion, and/or a second cationic monomer represented by the following general formula (II):

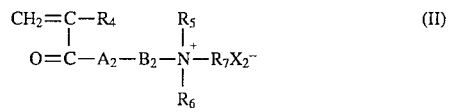

where $R_4$ is either hydrogen or $CH_3$; $R_5$ and $R_6$ are each an alkyl group having 1 to 2 carbon atoms; $R_7$ is a hydrogen atom or an alkyl group having 1 to 2 carbon atoms; $A_2$ is either an oxygen atom or NH; $B_2$ is either an alkylene group having 2 to 4 carbon atoms or a hydroxypropylene group and $X_2^-$ is a counterion, and (meth)acrylamide in an aqueous solution of from 13 to about 18 percent by weight of a polyvalent anionic salt; wherein the polymerization is carried out in the presence of the dispersant system of the invention and from about 1.5 to about 12 percent by weight of a seed polymer.

Other and further objects, advantages and features of the present invention will be understood by reference to the following specification in conjunction with the annexed drawing.

DESCRIPTION OF THE PREFERRED EMBODIMENTS

The dispersant system of the invention includes two polymers which are used to form polymer dispersions. A first dispersant polymer of the dispersant system is a copolymer of diallyldimethylammonium chloride (DADMAC) and a hydrophobic monomer selected from the group consisting of: quaternized dialkylaminoalkylacrylates (DMAEA), quaternized dialkylaminoalkylmethacrylates (DMAEM), quaternized dialkylaminoalkyl (meth)acrylamides, and alkyl esters of acrylic acid. Processes for synthesizing the first dispersant polymer are described in detail in co-pending U.S. patent application Ser. No. 08/074,960, filed Jun. 10, 1993, the disclosure of which is expressly herein incorporated by reference.

A second dispersant polymer is a water soluble high molecular weight cationic copolymer composed of 20 mole % or more of cationic monomer units represented by the formula (II) below, preferably the residual mole % is acrylamide or methacrylamide. An example of the second dispersant is quaternized polyDMAEA. The second dispersant polymer is hydrophilic and is discussed in detail in U.S. Pat. Nos. 5,006,590 and 4,929,655 and the discussion of which is expressly incorporated herein by reference.

The mole ratio of the first dispersant polymer to the second dispersant polymer in the dispersant system of the invention, is from about 95 to about 5 to about 5 to 95; and more preferably, from about 90 to 10 to about 25 to 75.

The DADMAC can be prepared in accordance with any conventional manner such as the technique described in U.S. Pat. No. 4,151,202 (Hunter et at.), which issued on Apr. 24, 1979, and which is incorporated herein by reference. The quaternized dialkylaminoalkylacrylate is preferably selected from the group consisting of: dialkylaminoalkylacrylates having $C_6$ to $C_{20}$ chloride quaternary, e.g., dimethylaminoethylacrylate benzyl chloride quaternary or dimethylaminoethylacrylate cetyl chloride quaternary. The quaternized dialkylaminoalkylmethacrylate is preferably selected from the group consisting of: dialkylaminoalkylmethacrylates having $C_6$ to $C_{20}$ chloride quaternary, e.g., dimethylaminoethylmethacrylate benzyl chloride quaternary or dimethylaminoethylmethacrylate cetyl chloride quaternary. The molar ratio of diallyldimethylammonium chloride to hydrophobic monomer in the range between about 99:1 to about 20:80, preferably about 90:10.

According to one embodiment of the invention, semi-batch process is preferably used to make the DADMAC copolymer dispersants and comprises the following steps:

a. adding diallyldimethylammonium chloride to a polymerization reaction vessel in an amount between about 1 to about 19 weight percent;

b. heating the diallyldimethylammonium chloride to a temperature in the range between about 47° C. to about 57° C.;

c. adding a polymer initiator dropwise to the diallyldimethylammonium chloride in an amount between about 0.05 to about 0.40 weight percent;

d. adding a hydrophobic monomer dropwise to the diallyldimethylammonium chloride in an amount between about 3 to about 19 weight percent; and e. heating the mixture of diallyldimethylammonium chloride, polymer initiator and hydrophobic monomer to a temperature in the range between about 47° C. to about 82° C.

Typically, deionized water is added periodically as needed during the polymerization process in a total amount between about 63 to about 88 weight percent. In some instances, it is preferable to mix diallyldimethylammonium chloride with NaCl and deionized water prior to addition to the reaction vessel. The NaCl is added in an amount between about 2 to about 3.5 weight percent and the deionized water is added in an amount between about 1 to about 2.5 weight percent. This diallyldimethylammonium chloride solution has a concentration of diallyldimethylammonium chloride in the range between about 50 to about 65.

This semi-batch process produces a hydrophobic dispersant with a pH in the range from about 3.5 to about 4.5.

The diallyldimethylammonium chloride, polymer initiator and hydrophobic monomer are heated at a temperature in the range between about 47° C. to about 57° C. for a period of between about 6 to 8 hours. Thereafter, the temperature of the reaction vessel is increased to about 72° C. to about 82° C. for a period of between about 3 to 7 hours. After polymerization has been completed the copolymer product is typically diluted with deionized water, cooled and stored. Alternatively, the hydrophobic monomer can be added in the reactor along with NaCl, DADMAC and water, and heated to about 47° to about 57°. The initiator solution is added dropwise, along with similar DI water addition. The polymer initiator is selected from the group consisting of 2,2'-azobis(2amidinopropane)hydrochloride (V50), 2,2'-azobis (N,N'-dimethylene isobutyramidine)dihydrochloride (VA044).

The novel dispersant system according to the present invention is particularly useful in processes for preparing a water soluble polymer dispersion. The dispersion is prepared by polymerizing a water soluble mixture of a cationic monomer represented by the following general formula (I):

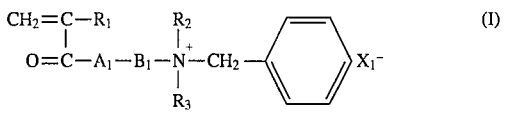

where $R_1$ is either hydrogen or $CH_3$; $R_2$ and $R_3$ are each an alkyl group having 1 to 3 carbon atoms; $A_1$ is either an oxygen atom or NH; $B_1$ is either an alkylene group having 2 to 4 carbon atoms or a hydroxypropylene group, and $X_1^-$ is an anionic counterion, and/or a second cationic monomer represented by the following general formula (II):

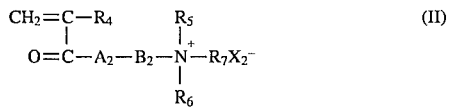

where $R_4$ is either hydrogen or $CH_3$; $R_5$ and $R_6$ are each an alkyl group having 1 to 2 carbon atoms; $R_7$ is a hydrogen atom or an alkyl group having 1 to 2 carbon atoms; $A_2$ is either an oxygen atom or NH; $B_2$ is either an alkylene group having 2 to 4 carbon atoms or a hydroxypropylene group and $X_2^-$ is an anionic counterions, and (meth)acrylamide in an aqueous solution of from about 10 to about 18 percent by weight of a polyvalent anionic salt; wherein the polymerization is carried out in the presence of the dispersant system of the invention and from about 1.5 to about 10 percent by weight of a seed polymer.

The (meth)acrylamide is typically present in an amount in the range between about 20 to about 95 mole %, the cationic monomer represented by the general formula (I) is typically present in an amount between about 5 to about 50 mole %; and the cationic monomer represented by the general formula (II) is typically present in an amount between about 5 to about 50 mole %. The use of the cationic monomer represented by the general formula (II) is optional. The dispersant system of the invention is present in an amount between about 2.5 to about 6 weight %, based on the total weight of the monomers of the dispersion.

Examples of monomers represented by the general formula (I) include quaternary monomers obtained by treating dimethylaminoethyl (meth)acrylate, diethylaminoethyl (meth)acrylate, dimethylaminopropyl (meth)acrylamide and dimethylhydroxypropyl (meth)acrylate, diethylaminopropyl (meth)acrylamide and dimethylaminohydroxylpropyl (meth)acrylate with benzyl chloride. One preferred monomer is N-benzyl-N-(meth)acryloxyethyl-N,N-dimethylammonium chloride.

Examples of monomers represented by the general formula (II) include methyl or ethyl quaternary salts of dimethylaminoethyl (meth)acrylate, diethylaminoethyl (meth)acrylate, dimethylaminopropyl (meth)acrylamide, diethylaminopropyl (meth)acrylamide and dimethylhydroxypropyl (meth)acrylate. One preferred monomer is N-(meth)acryloyloxyethyl-N,N,N-trimethyl ammonium chloride.

The inventors have discovered that process viscosities can be further reduced by carefully controlling the concentration of the multivalent anionic salt used to deposit the polymer of the present invention. The multivalent anionic salt in the present invention is preferably a sulfate or a phosphate, and typical examples of these salts include ammonium sulfate, sodium sulfate, magnesium sulfate, aluminum sulfate, ammonium hydrogen phosphate, sodium hydrogen phosphate and potassium hydrogen phosphate. According to one preferred embodiment of the invention, the salt is used in the form an aqueous salt solution at a concentration of from about 16 to about 18 by weight, more preferably 16.25 to about 17 percent by weight and most preferably, about 16.5 percent by weight. The dispersant system of this invention is at least partially soluble in the aqueous salt solution and highly soluble in water.

According to one embodiment of the invention, a seed polymer is added before the beginning of the polymerization of the above monomers for the purpose of obtaining a fine dispersion. It has been discovered that by adding the seed polymer in a concentration of from about 1.5 to about 12 percent by weight, process viscosity can be maintained below 5,000 cp, and preferably below 3,000 cp. More preferably, the seed polymer is added in a concentration of from about 3 to about 8 percent by weight, and most preferably in a concentration of from 5–7 percent by weight. The seed polymer is a water soluble cationic polymer insoluble in the aqueous solution of the polyvalent anionic salt. The seed polymer is preferably a polymer prepared from the above monomer mixture by the process described herein. Nevertheless, the monomer composition of the seed polymer need not always be equal to that of the water soluble cationic polymer formed during polymerization. However, like the water soluble polymer formed during polymerization, the seed polymer should contain at least 5 mole percent of cationic monomer units represented by the general formula (I). According to one embodiment of the invention, the seed polymer used in one polymerization reaction is the water soluble polymer prepared in a previous reaction which used the same monomer mixture.

Utilizing the dispersant system of the invention, and controlling the concentration of the multivalent anionic salt and the seed polymer permits the use of conventional latex reactors since the process viscosity during polymerization is maintained below about 5,000 cp, more preferably below about 3,000 cp. Furthermore, polymer batch preparations can be made including up to 40 percent by weight polymer.

The following examples are presented to describe preferred embodiments and utilities of the invention and are not meant to limit the invention unless otherwise stated in the claims appended hereto.

EXAMPLES

The following general procedure was used for manufacturing the polymer dispersions of the invention. If monomer concentration, seed concentration, salt concentration or dispersant polymer concentration was varied, it will be noted below in the individual example.

A monomer solution was placed into a batch reactor. The monomer solution includes DR 3000, a commercially available dispersion polymer available from Hymo Corporation, Japan. The DR 3000 preparation provides 20 grams of the seed polymer in every 100 grams of DR 3000. Also, in every 100 grams of DR 3000, there is one gram of polyDMAEA•MCQ dispersant polymer and twenty-two grams ammonium sulfate, which is the multivalent anionic salt.

Also into the batch reactor was placed the second dispersant polymer of the invention, a copolymer of DADMAC-DMAEA•BCQ. The DADMAC-DMAEA•BCQ copolymer works with the other dispersant polymer present in DR3000, polyDMAEA•MCQ, to substantially reduce process viscosities.

The monomer mixture used to form a dispersion terpolymer was AcAm, DMAEA•BCQ and DMAEA•MCQ. Co-stabilizers and chelants were also added when needed. V-50 obtained from Wako Chemical was used as the polymerization initiator. The multivalent anionic salt added to the batch reactor was ammonium sulfate. Post reaction additives generally included ammonium sulfate.

Once all the monomer solution was placed into the batch reactor, the reactants were heated to 48° C. A nitrogen purge was used. At 48° C. the polymerization initiator was added. The reactants were then heated for four hours at 48° C. Process viscosity was measured throughout the process. The reactants were cooled and the post addition salt was added.

Example 1

| Formula A | |
|---|---|
| DR-3000 20% | 300.00 g/60 g polymer |
| DADMAC-DMAEA.BCQ (20%) | 34.75 g |
| AcAm (48.0%) | 101.15 g |
| DMAEA.BCQ (80%) | 88.77 |
| DMAEA.MCQ (80%) | 25.35 |
| Glycerol | 4.20 |
| Versene | 0.40 |
| V-50 | 2.80 |
| Ammonium Sulfate | 94.00 |
| DI Water | 288.58 |
| Post Addition | |
| Salt | 60.00 |

Using 6.0 % seed, the dispersant system of the invention, and 17.02% salt, the process viscosity was maintained below 400 cp.

Example 2

| Formula B | |
|---|---|
| DR-3000 (20%) | 150.00 (30 g polymer) |
| DADMAC-DMAEA.BCQ (20%) | 42.20 |
| AcAm (48.0%) | 122.87 |
| DMAEA.BCQ (80%) | 107.78 |
| DMAEA.MCQ (80.5%) | 30.78 |
| Glycerol | 5.00 |
| Ammonium Sulfate | 127.00 |
| Versene | 0.30 |
| V-50 | 3.40 |
| DI Water | 341.67 |
| Post Addition: | |
| Acetic Acid | 8.50 |
| Ammonium Sulfate | 60.00 |

Using 3.0% seed, the dispersant system of the invention and 17.2% salt, the process viscosity was maintained below 1,100 cp.

Example 3

In Example 3, process viscosities were measured during a process to produce a dispersion polymer having a monomer mole ratio of 65/25/10 of the monomers AcAm, DMAEA•BCQ and DMAEA•MCQ, respectively. The preparation contained 20% active monomer, 16% salt and 6.67% of the preformed polymer of same composition as recycled seed. The preparation also contained polyDMAEA•MCQ and DADMAC-DMAEA•BCQ copolymer as dispersant polymers. The ratio of the dispersant polymers was varied to minimize process viscosities. Over a period of eight subsequent generations, peak viscosity was no higher than 9,500 cp and was substantially lower for all but one polymerization process. This demonstrates that the invention maintains peak viscosity below about 10,000 cp and generally maintains it below about 5,000 cp.

Example 4

Example 4 was the same as Example 3 with the following exceptions: 20% monomers, 17% salt and 5.0% recycled seed. Over a period of eight subsequent generations, peak viscosity was no higher than 4,500 cp. This demonstrates that the invention maintains peak viscosity below about 5,000 cp.

Example 5

Example 5 was the same as Example 3 with the following exceptions: 25% active monomers, 17% salt and 5.0% recycled seed. Over a period of eight subsequent generations, peak viscosity was no higher than 5,000 cp. This demonstrates that the invention maintains peak viscosity below about 5,000 cp.

Changes can be made in the composition, operation and arrangement of the method of the present invention described herein without departing from the concept and scope of the invention as defined in the following claims:

We claim:

1. A process for preparing a water soluble polymer dispersion which comprises polymerizing a water soluble mixture which comprises:

a cationic monomer represented by the following general formula (I):

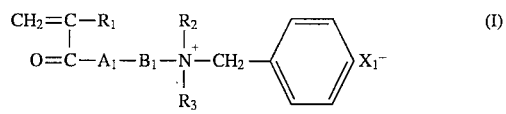

wherein $R_1$ is either hydrogen or $CH_3$; $R_2$ and $R_3$ are each an alkyl group having 1 to 3 carbon atoms: $A_1$ is either an oxygen atom or NH; $B_1$ is either an alkylene group having 2 to 4 carbon atoms or a hydroxypropylene group, and $X_1^-$ is an anionic counterion, and/or a second cationic monomer represented by the following general formula (II):

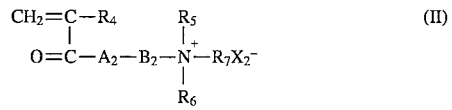

where $R_4$ is either hydrogen or $CH_3$; $R_5$ and $R_6$ are each an alkyl group having 1 to 2 carbon atoms; $R_7$ is a hydrogen atom or an alkyl group having 1 to 2 carbon atoms; $A_2$ is either an oxygen atom or NH; $B_2$ is either an alkylene group having 2 to 4 carbon atoms or a hydroxypropylene group and $X_2^-$ is an anionic counterion; and, b. (meth)acrylamide in an aqueous solution of a polyvalent anionic salt, wherein said polymerization is carried out in the presence of a first dispersant polymer which comprises a copolymer of diallyldimethyl-ammonium chloride and a hydrophobic monomer selected from the group consisting of dialkylaminoalkylacrylates having $C_6$ to $C_{20}$ quaternaries, dialkylaminoalkylmethacrylates having $C_6$ to $C_{20}$ quaternaries, and alkyl esters of acrylic acid, and a second dispersant polymer which is a water soluble cationic copolymer composed of at least 20 mole percent of cationic monomer units represented by formula (II) above.

2. The process according to claim 1 wherein said dialkylaminoalkylacrylates having $C_6$ to $C_{20}$ quaternaries are either dimethylaminoethylacrylate benzyl chloride quaternary or dimethylaminoethylacrylate cetyl chloride quaternary.

3. The process according to claim 1 wherein said dimethylaminoethylmethacrylates having $C_6$ to $C_{20}$ quaternaries are either dimethylaminoethylmethacrylate benzyl chloride quaternary or dimethylaminoethylmethacrylate cetyl chloride quaternary.

4. The process according to claim 1 wherein said alkyl ester of acrylic acid is ethyl hexyl acrylate.

5. The process according to claim 1 wherein said diallyldimethylammonium chloride and said hydrophobic monomer are present in a molar ratio in the range from 99:1 to 20:80.

6. The process according to claim 1 wherein said (meth)acrylamide is present in an amount in the range between about 20 to about 95 mole %.

7. The process according to claim 1 wherein said cationic monomer represented by the general formula (I) is present in an amount between about 5 to about 50 mole %.

8. The process according to claim 1 wherein said cationic monomer represented by the general formula (II) is present in an amount between about 5 to about 50 mole %.

9. The process according to claim 1 wherein said dispersant polymers are present in a combined amount of between about 2.5 to about 6 weight %, based on the total weight of the monomers of said dispersion.

10. The process according to claim 1 wherein monomers represented by the general formula (I) are selected from the group consisting of: quaternary monomers obtained by treating dimethylaminoethyl (meth)acrylate, diethylaminoethyl (meth)acrylate, dimethylaminopropyl (meth)acrylamide and dimethylhydroxypropyl (meth)acrylate, diethylaminopropyl (meth)acrylamide and dimethylaminohydroxylpropyl (meth)acrylate with benzyl chloride.

11. The process according to claim 1 wherein monomers represented by the general formula (II) are selected from the group consisting of: methyl and ethyl quaternary of dimethylaminoethyl (meth)acrylate, diethylaminoethyl (meth)acrylate, dimethylaminopropyl (meth)acrylamide, diethylaminopropyl (meth)acrylamide and dimethylhydroxypropyl (meth)acrylate.

12. The process according to claim 1 wherein the process viscosity during polymerization is about 5,000 cp or lower.

13. The process of claim 1 wherein the process the polymerization is carried out in the presence of from about 1.5 to about 15% by weight of a seed polymer.

14. The process of claim 1 wherein the process the polymerization is carried out in the presence of from about 3 to about 8% by weight of a seed polymer.

* * * * *